US006434389B1

United States Patent
Meskanen et al.

(10) Patent No.: US 6,434,389 B1
(45) Date of Patent: Aug. 13, 2002

(54) METHOD FOR SELECTING CELL IN CELLULAR NETWORK

(75) Inventors: Harri Meskanen, Helsinki; Petri Jolma, Espoo, both of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/517,769

(22) Filed: Mar. 3, 2000

Related U.S. Application Data

(63) Continuation of application No. PCT/FI98/00692, filed on Sep. 4, 1998.

(30) Foreign Application Priority Data

Sep. 5, 1997 (FI) .................................................. 973616

(51) Int. Cl.[7] .............................................. H04Q 7/20
(52) U.S. Cl. ...................................... 455/437; 455/436
(58) Field of Search ................................. 455/436, 437, 455/439, 443, 444, 525; 370/331, 332

(56) References Cited

U.S. PATENT DOCUMENTS

| 5,541,978 | A | * | 7/1996 | Brunner et al. | ................ | 379/60 |
| 5,915,219 | A | * | 6/1999 | Poyhonen | ................... | 455/435 |
| 6,345,181 | B1 | * | 2/2002 | Janhonen et al. | ........... | 455/406 |

FOREIGN PATENT DOCUMENTS

| EP | 0757 453 A2 | 2/1997 | ................ 455/525 |
| WO | WO 95/02309 | 1/1995 | ................ 455/525 |
| WO | WO 98/38827 | 9/1998 | ................ 455/436 |

OTHER PUBLICATIONS

Mouly, Michael, Pautet, Marie–Bernadette. "The GSM System for Mobile Communications", France: Cell & Sys, 1992, p. 453.

* cited by examiner

*Primary Examiner*—Thanh Cong Le
*Assistant Examiner*—Tuan Tran
(74) *Attorney, Agent, or Firm*—Altera Law Group, LLC

(57) ABSTRACT

The present invention relates to prioritizing special cells in cell selection in a cellular radio network. In a cellular radio network one or more cells provide a subscriber with special services or tariffs not offered to all subscribers. These cells are called subscriber's special cells. The mobile station measures an average reception level and calculates by means of them cell selection parameters on the basis of which the best cell is selected. In accordance with the invention, when the mobile station detects that the cell is one of cells of a special cell list stored in a memory, it checks first if the cell fulfils a minimum requirement of cell selection on the basis of the measured signal level. If the minimum requirement is fulfilled, the mobile station manipulates the calculation of the cell selection parameter of a special cell to the effect that the selection probability of a special cell is improved with respect to a normal cell. In a preferred embodiment of the invention, the manipulation of the calculation comprises a step of adding a predetermined margin to the measured signal level of a special cell before the cell selection parameter is calculated. This will minimize the possibility that the mobile station would accidentally be camped on a normal cell when it is within the area of a special cell.

25 Claims, 2 Drawing Sheets

METHOD FOR SELECTING CELL IN CELLULAR NETWORK

This application is a continuation of international appln. SN. PCT/FI98/00692, filed Sep. 4, 1998.

FIELD OF INVENTION

The invention relates generally to cell selection by a mobile station in a cellular radio network where cells can be defined as subscriber-specific special cells.

BACKGROUND OF INVENTION

In cellular mobile communication systems a mobile station can move freely in the area of the mobile communication network and camp on the most suitable cell at each time. When the mobile station (MS) is switched on, it attempts to make contact with a public land mobile network (PLMN). A particular PLMN to be contacted can be selected either automatically or manually. The MS searches for a suitable cell of the selected PLMN and selects that cell to provide the available services and tunes onto the control channel (broadcasting channel) of the selected cell. The selection is referred to as camping on a cell. For the purpose of cell selection, the MS measures all radio channels of the PLMN or all radio channels according to a stored cell list. The MS typically calculates for each radio channel several averages of the measured received signal level used for cell selection. The MS can then also register its presence in the location area (LA) of the selected cell if necessary, by a location updating procedure or the like. When the MS has carried out the cell selection process and selected the cell, it starts to listen to the control channel of this cell to receive services. The cell that the MS is camped on in this way is called a serving cell. When the MS is camped on a cell but does not communicate with the cell (no call), it is in a mode called an idle mode. In the idle mode the MS measures not only the signal received from the serving cell, but at least the received signal levels of non-serving adjacent cells. An average is generally calculated from the measured signal levels of each cell, the average being used as a cell selection criterion as such, or by calculating specific cell selection parameters. The MS may also monitor the radio path loss between the mobile station and the serving base station and reject in the selection process the cells where the radio path loss is lower than a specific threshold value. Furthermore, cell selection criteria may include hysteresis and timings by which (in addition to averaging measurement results) unnecessary cell reselections and location updatings due to temporary variations in radio conditions are to be prevented. As examples of the camping facility and cell selection process and criteria of the mobile station, reference is made to GSM (Global System for Mobile Communications) and DCS (Digital Communication Systems) mobile communication systems, particularly to the GSM recommendation GSM 03.22 (version 5.0.0) and 05.08 (version 5.1.0).

One feature of cellular radio networks is that the network should know the location of the mobile station in the network to be able to page it and route calls to it. Logical location areas consisting one or more cells are typically defined in cellular networks. The information about the location of the mobile station is stored in the network at the accuracy of a location area. Cells broadcast information indicating the location area they belong to. When the mobile station upon selecting a new cell finds that the location area is changing, it makes a location updating to the network. In order to reduce location updating signalling it would be advantageous that the location areas were as large as possible. On the other hand, the mobile station is paged in all the cells of the location area, in which case it would be preferable for paging signalling that the size of the location area would be as small as possible. The size of the location area is typically a compromise between these two demands.

One known alternative is that instead of or in addition to fixed location areas, location areas specific for each subscriber are determined in the network, and cells are selected to the subscriber-specific location areas to the effect that the typical mobility area of a specific subscriber and other requirements are taken into account as well as possible.

One of the objectives in mobile communication systems has recently been to develop mobile station services to be more and more equal to the conventional services of the fixed network so that they could replace fixed-line services both in offices and at home. In other words, a subscriber or a company is provided with a service area to which specific cells are selected (known e.g. as special cells) where a local subscriber-specific service profile, for example, is defined. That is to say, services and tariffs dependent on the location of the subscriber are produced for the subscriber. This cluster of cells is referred to as a Localized Service Area LSA or an LGS area. The subscriber can be an ordinary home user, for example, whose LSA is part of the radio access network covering his/her home and its immediate surroundings. Within this LSA special tariffs can be offered only for the home subscriber. The subscriber can also be a company employee to whom the localized service area LSA forms a company-wide network that utilizes the radio access solutions in the premises, for example. In the LSA, special tariffs can be offered only for company employees. The LSA typically comprises a cell or a cluster of cells. The cells in the cluster of cells can also be dispersed.

It would be advantageous for the user to be able to use the special cells and the special tariffs and services provided by them as much as possible. As described above, in present cellular network systems the mobile station selects a cell with algorithms based on signal strength. In these algorithms all cells are treated democratically, that is, the selection can be directed to any suitable cell. When the subscriber of the LSA service is a home subscriber, the LSA is home, a flat or a house; a very compact area in any case. In that case the cell that is the dominating cell in this location area is selected as the subscriber's "home cell". It can be assumed that mobile calls in this location area are served by the home cell, but this cannot be ensured because of the fading phenomenon associated with radio wave propagation, for example. This can lead to that the home subscriber is not always able to utilize a lower tariff or special services. Even if the mobile station was provided with a feature that would inform the subscriber if the subscriber is camped on a special cell or not, the use of the service would be uncertain and uncomfortable for the subscriber. Correspondingly, the LSA of a company subscriber could typically be an office or a factory area. The LGS service is provided by means of a base station placed in the company premises. The coverage area of the base station is planned so that the LSA cell covers the whole defined LSA, but it does not necessarily dominate the whole area. For example, at the boundaries of the LSA cell, such as near room windows, the downlink signal of some adjacent cell can be stronger, in which case under normal conditions the MS camps on this adjacent cell. If the office is small and office-specific cells are not installed there, the office cell is similar to the "home cell" concept described above.

DISCLOSURE OF INVENTION

The object of the invention is to improve cell selection in the cellular radio network to the effect that the mobile station prioritizes the special cell/cells whenever it is in its/their area.

This will be attained with the method of the invention for selecting a cell of a cellular radio network in a mobile station, which method comprises the steps of:

measuring signal levels of a serving cell and adjacent cells in a mobile station in the idle mode, calculating a cell selection parameter for each measured cell by means of the measured signal levels, and selecting the best cell to be the serving cell on the basis of the cell selection parameters.

The method is characterized in that the method further comprises the steps of:

comparing the cells to be measured with a special cell list stored in the memory of the mobile station, checking if each cell identified as a special cell fulfils the pre-determined minimum requirement of cell selection on the basis of the measured signal level, and manipulating the calculation of a cell selection parameter of a special cell that fulfils the minimum requirement to the effect that the selection probability of a special cell is improved with respect to a normal cell.

The invention further relates to a cellular radio system comprising mobile stations and base stations, the mobile stations being arranged to measure in the idle mode the received signal levels of cells and to select as the serving base station the cell which is the best on the basis of a cell selection parameter calculated by means of the measured signal levels. The system is characterized in that the mobile station comprises means for storing a special cell list, means for comparing the cells to be measured with the special cell list, a means which checks if a cell identified as a special cell fulfils the pre-determined minimum requirement of cell selection on the basis of the measured signal level, and means for manipulating the calculation of the cell selection parameter of a special cell that fulfils this minimum requirement to the effect that the selection probability of a special cell is improved with respect to a normal cell.

The invention also relates to a mobile station which is arranged to measure in the idle mode the received signal levels of cells and to select as the serving base station the cell which is the best on the basis of the cell selection parameter calculated by means of the measured signal levels. The mobile station is characterized in that the mobile station comprises means for storing a subscriber-specific special cell list, means for comparing the cells to be measured with the special cell list, a means which checks if a cell identified as a special cell fulfils the pre-determined minimum requirement of cell selection on the basis of the measured signal level, and means for manipulating the calculation of the cell selection parameter of a special cell that fulfils the minimum requirement to the effect that the selection probability of a special cell is improved with respect to a normal cell.

In the invention the mobile station is arranged to store a list of special cells which are defined for it in the whole network or in a local section of the network. On the basis of this stored information and system information broadcast by the cells, the mobile station is able to identify the special cells in the neighbourhood.

The mobile station measures the reception levels of downlink signals of surrounding cells, including a possible serving cell (typically by calculating the average signal level for each cell on the basis of several measurements). A cell selection parameter of the used cell selection criterion is calculated by means of this measured (preferably average) signal level. In this application, the calculation of the cell selection parameter refers to the determination or calculation of any reference value used in cell selection. This parameter can be directly measured (preferably average) signal level, but typically it is another value calculated by means of the measured signal level, such as cell selection parameter C2 in the GSM mobile communication system. According to the basic principle of the invention, the calculation of the cell identified as a special cell is processed to the effect that the special cell will be provided with a better cell selection parameter value than a normal cell on the same measured signal level. In this way the selection probability of the special cell is improved in comparison with the normal cell. In other words, the cell selection algorithm of the invention prioritizes special cells with respect to normal cells. In the invention the prioritization is made only if the special cell fulfils the pre-determined minimum requirement of cell selection on the basis of the measured signal level. In practice this may mean that the received signal level has to exceed the predetermined minimum level, or the radio path loss between the mobile station and the base station has to fall below a certain threshold value. For example, in the GSM system the path loss parameter C1 has to be higher than zero before the special cell prioritization of the invention is allowed. In this way the prioritization of the special cell is prevented from causing the mobile station to be camped on a special cell whose signal level is too low, and thus the negative effects on the spectrum efficiency of the mobile network are avoided. Operators of the mobile network occasionally set the minimum requirement of the cell selection of normal cells very low. In such a case a higher minimum requirement of cell selection can be used for special cells than for normal cells and this way the selection of a special cell of a very poor quality can be avoided. The minimum requirements of cell selection are preferably selected by the operator and the cells typically broadcast information reporting the minimum requirements.

In the preferred embodiment of the invention, a special cell is prioritized by adding a pre-determined margin to the measured (preferably average) signal level of the special cell before the actual determination of the cell selection parameter and completion of the cell selection. In this way, the "measured" signal level used in the cell selection is higher than in reality, which naturally leads to that the special cell is classified as the best or as one of the best in cell selection. In this way the invention ensures very efficiently that a special cell is selected as a serving cell provided that it has a sufficient signal level. The use of the margin of the invention makes it, however, possible for the mobile station to camp on a normal cell as well in case the signal strength of the normal cell exceeds the signal strength of the special cell by at least the margin mentioned above. This stops the mobile station from "hanging onto" the special cell for ever as would be the case if the cell selection took place only when the signal level falls below the minimum requirement. By suitable selections of the margin and minimum requirement of the invention, a required balance can be looked for between the use of the special cell and the neighbouring adjacent cells without deteriorating the service level or without causing negative effects to the spectrum efficiency of the network. This margin is preferably broadcast to the mobile stations from the base station of the serving cell so that it can be adjusted dynamically and locally.

Alternatively, a corresponding margin can be added directly to the final cell selection parameter or any other parameter used in the calculation of the cell selection parameter.

BRIEF DESCRIPTION OF DRAWINGS

In the following, the present invention is explained with reference to he appended drawings, wherein.

DESCRIPTION OF PREFERRED EMBODIMENTS

Figure 1:
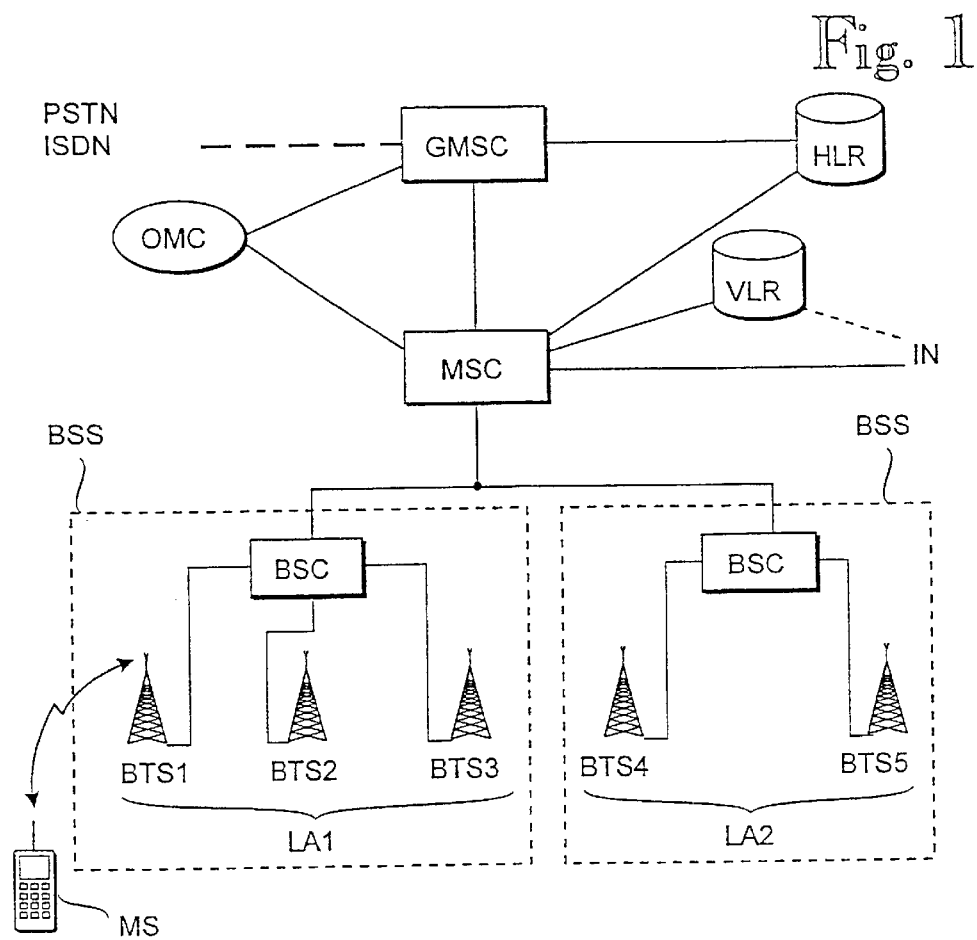
FIG. 1 shows a simplified structure of the GSM network.

The present invention can be applied to cell selection and to the camping function of the mobile station in any cellular radio system. In the following, the invention is explained in more detail in connection with the European digital GSM mobile communication system (Global System for Mobile Communications) and its version DCS1800 (Digital Communications System). FIG. 1 is a simplified view of the structure of the GSM network. For a more detailed description of the GSM system, reference is made to GSM recommendations and to The GSM System for Mobile Communications by M. Mouly and M. Pautet, Palaiseau, France, 1992, ISBN:2-9507190-0-0-7.

Referring to FIG. 1, the mobile station MS is camped on via a radio path to one of base transceiver stations BTS, in the case of FIG. 1 to the base station BTS1. The mobile station MS in the idle mode receives the broadcast of the selected base station. The base station system BSS comprises a base station controller BSC and base stations BTS controlled by it. The mobile services switching centre MSC generally controls several base station controllers BSC. The MSC is connected to other mobile services switching centres, to the gateway mobile services switching centre GSMC and possibly to the intelligent network IN. Via the gateway mobile services switching centre GMSC, the GSM network is connected to other networks, such as the public switched telephone network PSTN, another mobile communication network PLMN, the network ISDN or the intelligent network IN. The operation of the whole system is monitored by the operation and maintenance centre OMC.

The subscriber data of the mobile station MS is stored permanently in the home location register HLR of the subscriber and temporarily in the visitor location register VLR in which area the MS is currently located. The location information of the subscriber (mobile station MS) is stored in the visitor location register at the accuracy of the location area LA. The geographical area monitored by the visitor location register is divided into one or more location areas LA. The MS is able to move freely within each location area without informing the VLR. One or more base stations BTS can operate in each location area.

The base stations BTS send continuously information on their broadcast channel about themselves and their surroundings, such as a cell identity CI, adjacent cell information and a location area identifier LAI. On the basis of the last-mentioned, the mobile station MS listening to the broadcast of the base station BTS knows within which location area it is located at that time. If the mobile station MS detects when a new base station BTS is being camped on that the location area identifier LAI of the new base station is different from the LAI of the old base station, the mobile station sends a location updating request to the network. The location area LA of the subscriber is updated to the visitor location register VLR in which area the MS is at the time. Information is transmitted to the home location register HLR of the subscriber about the VLR area where the subscriber is located.

The MS continuously measures the downlink signals of the base stations BTS of the cells closest to the serving cell for example to determine the base station providing the best signal level and for a possible cell reselection. On the basis of adjacent cell information sent by each cell on the broadcast channel, the MS identifies the adjacent cells it should monitor. For example, in the GSM mobile communication system the MS can measure simultaneously in addition to the serving base station the signal level and/or signal quality of at most 32 other base stations. When moving within the mobile communication network area, the MS camps on the cell within the strongest signal.

A problem in this conventional network is that all the mobile stations authorized to use the network have to be served by the cells substantially in the same way. It is thus not possible for some cells to provide an individual subscriber or subscriber groups with tailored special services or tariffs to which other subscribers have no authorization.

In accordance with the local GSM service concept (LGS) described above, it is intended that in the future a special service area from specific (one or more) cells of the network, i.e. special cells are defined for a mobile subscriber. In this application, special cells refer to a cell in normal network planning in which cell some special service can be offered to the subscriber. The special cell can be a macrocell, microcell or picocell. An operator selects the cells of the network that are defined as special cells of a specific mobile subscriber and thus they are attached to the local service area LSA which is formed for the mobile subscriber. The mobile station stores a cell list that indicates the special cells of the user of the mobile station directly by means of cell identifiers, or indirectly by means of some other suitable identifier. A suitable storing location for this purpose is a subscriber identification module SIM, for example.

It is not essential for the invention how the special cells or the LSA will be defined in the network, stored in the network registers or reported to the mobile station. Examples of solutions relating to this are disclosed in Applicant's co-pending patent application FI-970034 which is included herein as reference. It is only essential for the invention that a special cell list of a subscriber is stored in the mobile station at some stage, which list can be utilized in the cell selection of the invention.

The local service area LSA can be defined in compliance with the subscriber's needs to be of an arbitrary size and shape. It can be a very small service area, such as a "home area" covering one or more cells, a very large area covering a part of a city (one or more location areas), or a combination of them. It should also be noted that the logical location areas defined in the network and the subscriber-specific local service areas are independent of one another. The local service areas LSA of different subscribers and subscriber groups can be superimposed or overlapping, that is, one cell may be part of several local service areas.

Figure 2:
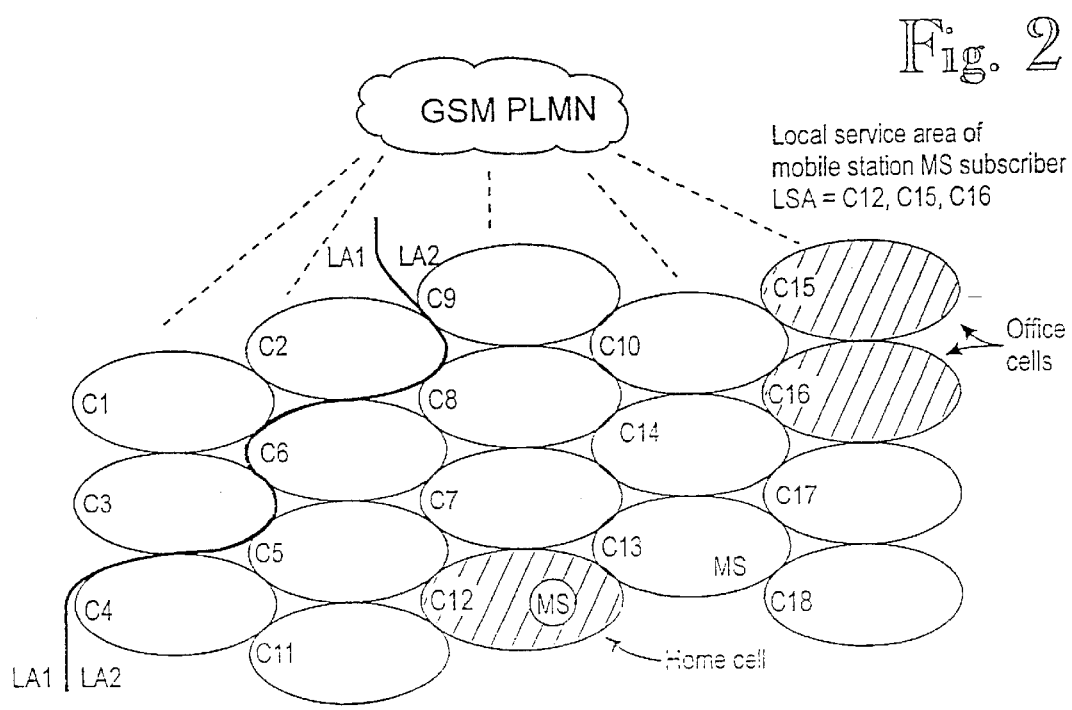
FIG. 2 illustrates the local service area concept in a cellular radio network.

The local service area concept is illustrated in FIG. 2. The figure shows cells C1 to C18 of which C1 to C3 belong to location area LA1 and cells C4 to C18 belong to location area LA2. FIG. 2 also shows the local service area LSA of one mobile subscriber, the area comprising home cells C12 and office cells C15 to C16. In this example, C12 and C15 to C16 are ordinary cells of the GSM network that are available to all subscribers of the cellular network. For the subscriber in question they are, however, special cells because in these cells the subscriber can have lower call tariffs than normal tariffs. Instead of being general network cells, office cells C15 and C16 can be private office cells to which only company employees have access. Other users visiting the company premises will use the public cells covering the location area of the office.

As stated earlier, conventional cell selection algorithms treat cells democratically, that is, the strongest cell is selected to be the serving cell. This can lead to that a mobile station, for example, located in the area of its user's home cell C12, camps on an adjacent cell C7 that is for some reason stronger. In that case the subscriber is not able to utilize the special service of the home cell, such as cheap tariff, but has to use normal tariffs of the cell C7. For this reason, a mechanism is required for directing the MS to prioritize the special cells of the subscriber in cell selection, but in a way that the quality of service is not deteriorated and no other negative effects are caused to the efficiency and operation of the network.

In the following, the method of the preferred embodiment of the invention is described for prioritizing subscriber's special cells in connection with cell selection with reference to FIGS. 2 and 3. It is assumed first that the mobile station MS is located in the subscriber's home cell C12 in FIG. 2. The MS is in the idle mode and camped on the base station of the cell C12 and receives on the broadcast and control channel BSSH/CCH of the cell. The MS receives on the broadcast channel BCCH system information (step 30 in FIG. 3) including e.g. adjacent cell information (an adjacent cell list), and parameters RXLEV_ACCESS_MIN and MS_TXPWR_MAX_CCH which are used in the calculation of the parameters C1 and C2 as described in recommendations GSM 03.22 and 05.08. RXLEV_ACCESS_MIN is the minimum received level in the mobile station needed for accessing the system in a normal cell. In other words, the parameter indicates the smallest received signal strength on which the cell can be selected. Network operators occasionally set the value of the parameter RXLEV_ACCESS_MIN very low which may lead to the selection of a cell even in a situation where it cannot offer a proper service. For this reason in the preferred embodiment of the invention, the broadcast system information also contains a parameter LSA_RXLEV_ACCESS_MIN having a higher value than that of the parameter RXLEV_ACCESS_MIN and this way the sufficient quality for the connection is ensured in the selected special cell. The system information broadcast in a cell also contains a parameter LSA_CAMPING_MARGIN used for prioritizing special cells, as will be explained in more detail below. The MS regularly measures the received signal levels of the serving base station and neighbouring base stations and calculates the cell-specific average signal levels, step 31, FIG. 3.

Whenever the signal levels are updated, a path loss parameter C1 and a path loss parameter C2 are also calculated for each cell. According to a first embodiment of the invention, the calculation of the parameters C1 and C2 is, however, different depending on whether the cell is a normal cell or a special cell of the mobile subscriber. To identify special cells, the MS compares the cell identifier of each cell to a special cell list stored in the mobile station, the list being obtained in connection with location updating, for example (step 32).

In case the cell is not found in steps 32 and 33 from the special cell list, the process moves to step 34 where the path loss parameter C1 is calculated according to present GSM specifications. In other words, C1=(A-Max(B,0)) where
   A=the received level average-RXLEV_ACCESS_MIN
   B=MS_TXPWR_MAX_CCH-P
   MS_TXPWR_MAX_CCCH=the maximum transmission power level the MS can use for accessing the system unless otherwise commanded,
   P=the maximum output power of the mobile station.

When C1 has been calculated in step 34, it is checked in step 37 if the value of the parameter C1 is higher than zero. If it is not, the routine proceeds to step 40. If C1>0, the routine proceeds to step 39 where the cell selection parameter C2 is calculated as specified in the present GSM recommendations. In other words, C2=C1-CELL_RESELECT_OFFSET, where
   CELL_RESELECT_OFFSET=the cell selection offset in the cell in question. When the parameter C2 has been calculated, the routine proceeds to step 40.

In case the cell is identified in step 33 as a special cell, the process moves to step 35 where the path loss criterion C1 is calculated for the special cell by using a parameter LSA_RXLEV_ACCESS_MIN which requires a higher minimum signal level from an acceptable cell. In other words, C1=(A-Max(B,0))
where
   $A=RXLEV_{AVE}$-LSA_RXLEV_ACCESS_MIN,
   B=MS_TXPWR_MAX-P.

After this it is checked in step 36 if C1>0. If it is not, the routine proceeds to step 40. If C1>0, the routine moves to step 38 where a cell selection parameter C2 is calculated. As it is a special cell, the calculation of the parameter C2 has been modified to the effect that a better value is obtained as a result for the parameter. C2 than for a normal cell to which the same average signal level has been measured. A special cell is prioritized in this way in cell selection. In a preferred embodiment of the invention, the value of the parameter LSA_CAMPING_MARGIN is added to the measured average signal level $RXLEV_{AVE}$ to obtain a higher signal level than in reality for the special cell. The parameter C2 is then calculated by using this elevated signal level, in which case the special cell will be automatically prioritized in comparison with equally strong or stronger normal cells. In that case the equation for calculating the parameter C2 can be as follows $$C2=[(A+LSA\_CAMPING\_MARGIN)-MAX(B,0)]-CELL\_RESELECT\_OFFSET$$

When C2 is calculated in step 38, the routine moves to step 40. In step 40 it is checked if the parameters C1 and C2 have been calculated for each cell. If not, the routine returns to step 32 to make an identification of the next cell. If all cells have been examined, the process moves to step 41 where primarily the cell with the highest value of the parameter C2 is selected as the serving cell. If the selected cell is the present serving cell, a new parameter updating cycle is started after a while by returning to step 30. If the selected cell is a new cell, the PCCH/CCCH radio channel of the new cell is tuned to for receiving system information and other signalling.

Because of the above arrangement, the MS stays camped on the home cell C12, for example, in FIG. 2, until the signal level of some adjacent cell exceeds the signal level of cell C12 by the value of the parameter LSA_CAMPING_MARGIN. Typically, this occurs when the MS moves away from the area of the home cell. The value of the parameter LSA_CAMPING_MARGIN can range from 20 to 40 dB, for example.

Figure 3:
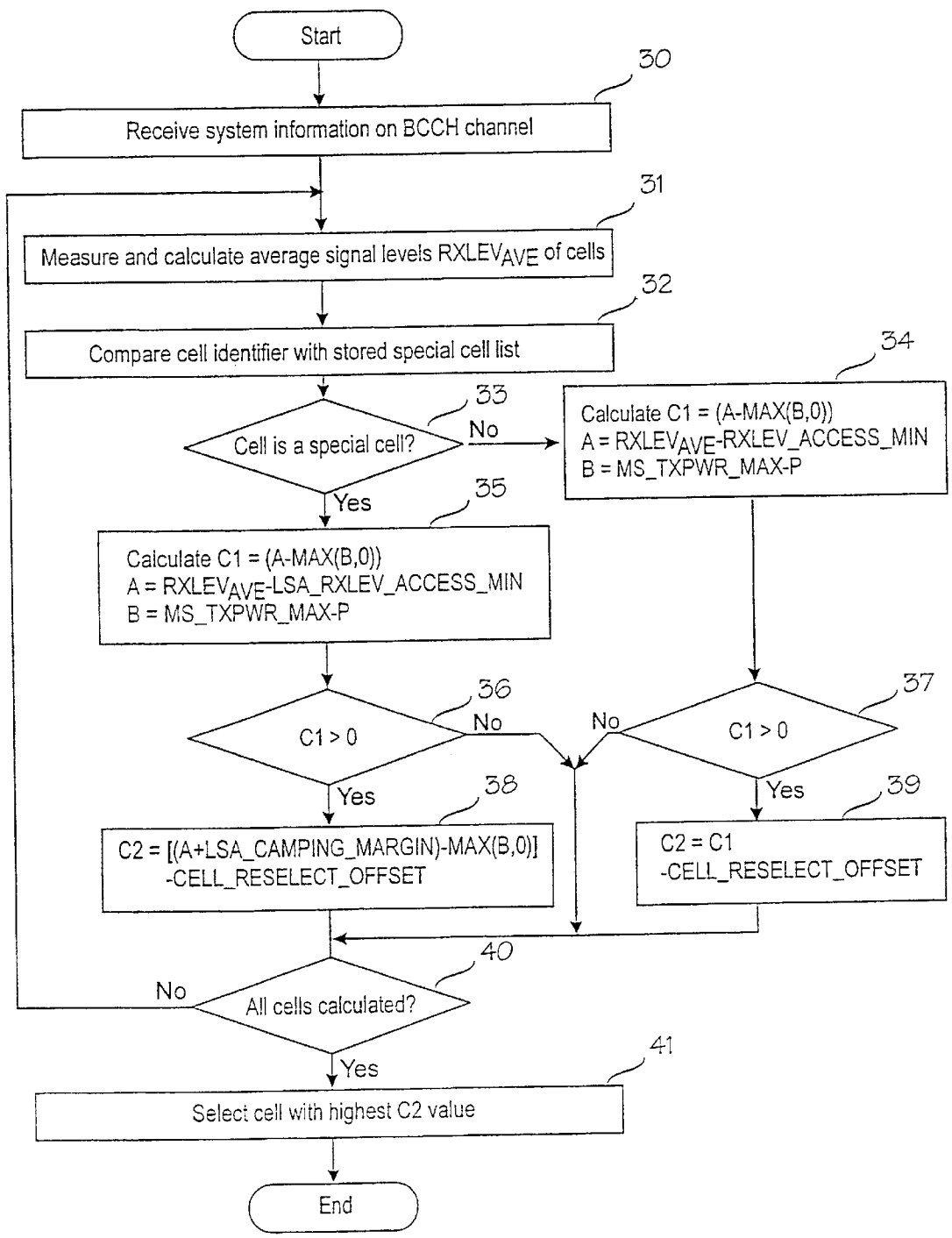
FIG. 3 is a flow diagram illustrating the cell selection according to the invention by a mobile station.

In the embodiment shown in FIG. 3, a sufficiently good quality of connection is ensured in a special cell by using a higher minimum signal level LSA_RXLEV_ACCESS_MIN in calculating the parameter C1. If the minimum signal level LSA_RXLEV_ACCESS_MIN specified by the operator for a normal cell is anyway considered to provide a sufficient quality, the same calculation method of the parameter C1 can be used in step 35 for a special cell as for a normal cell in step 34.

The invention was described above by using cell re-selection as an example when the MS is already camped on some cell. This is the most typical situation in which the present invention is used. Another special situation is when the MS carries out initial access to the network after the power has been switched on, for example. The invention can be utilized in this situation as well. The invention can, however, slow down initial access to the network, for which reason in one embodiment of the invention the prioritization of special cells is prevented until the MS is camped on some cell in the network. After this, the prioritization of cells will start by means of the re-selection process described above.

It is further possible to use in connection with the parameter C2 described above all normal cell selection restrictions, such as hysteresis when the location area changes, time restrictions, etc.

It should also be noted that when a special cell is identified and its signal level is found to fulfil the minimum requirement, it is possible to influence the parameter C2 in other ways in place of the manipulation of the measured signal level. The parameter C2 can be calculated in the normal way, for example, after which it is supplemented by a suitable margin LSA_CAMPING_MARGIN that prioritizes the special cell in the desired way. In that case it is possible in step 38 of FIG. 3 to calculate C2 first according to the GSM specifications and then carry out the prioritization C2=C2+LSA_CAMPING_MARGIN according to the invention.

It is to be understood that in other mobile communication systems, using various cell selection algorithms and cell selection parameters, the manipulation of parameter calculation can vary depending on the case, without deviating from the basic idea of the invention.

In other respects the figures and the specification relating to them are only intended to illustrate the present invention. In its details the invention can vary within the scope and spirit of the appended claims.

What is claimed is:

1. A method for selecting a cell of a cellular radio network in a mobile station, which method comprises the steps of
measuring signal levels of a serving cell and adjacent cells in a mobile station in the idle mode,
calculating a cell selection parameter for each measured cell by means of the measured signal levels, and
selecting the best cell to be the serving cell on the basis of the cell selection parameters,
characterized in that the method further comprises the steps of
comparing the cells to be measured with a special cell list stored in the memory of the mobile station,
checking if each cell identified as a special cell fulfils the pre-determined minimum requirement of cell selection on the basis of the measured signal level, and
manipulating the calculation of a cell selection parameter of a special cell that fulfils the minimum requirement to the effect that the selection probability of a special cell is improved with respect to a normal cell.

2. A method according to claim 1, characterized in that the step of manipulating the calculation of the cell selection parameter comprises a step of adding a pre-determined margin to the measured signal level of a special cell before the cell selection parameter is calculated to the effect that the selection probability of a special cell is improved with respect to a normal cell.

3. A method according to claim 1, characterized in that the step of manipulating the calculation of the cell selection parameter comprises a step of adding a pre-determined margin to the cell selection parameter of the special cell to the effect that the selection probability of a special cell is improved with respect to a normal cell.

4. A method according to claim 1, characterized in that the method comprises the step of
broadcasting the pre-determined margin to the mobile stations from the base station of the serving cell.

5. A method according to claim 1, characterized in that the method comprises the step of
broadcasting to the mobile station from the base station of the cell a first parameter reporting the lowest signal level the mobile station is to receive from the measured cell to fulfil the minimum requirement for a normal cell.

6. A method according to claim 1, characterized in that the calculation of the minimum requirement for a normal or special cell comprises the steps of
calculating a parameter C1=(A−Max(B,0)) where
A=the received level average−RXLEV_ACCESS_MIN
B=MS_TXPWR_MAX_CCH−P
RXLEV_ACCESS_MIN=the minimum received level at the mobile station required for accessing the system
MS_TXPWR_MAX_CCCH=the maximum transmission power level the mobile station can use for accessing the system unless otherwise commanded,
P=the maximum output power of the mobile station, considering the minimum requirement to be fulfilled if C1>0.

7. A method according to claim 1, characterized in that the method comprises the step of
broadcasting to the mobile station from the base station of the cell a second parameter reporting the lowest signal level the mobile station is to receive from the measured cell to fulfil the minimum requirement for a special cell, the second parameter being higher than the first parameter.

8. A method according to claim 7, characterized in that the calculation of the minimum requirement comprises the steps of
calculating a parameter C1=(A−Max(B,0)) where
A=the received level average−RXLEV_ACCESS_MIN when the cell is a normal cell,
A=the received level average−LSA_RXLEV_ACCESS_MIN when the cell is a special cell,
B=MS_TXPWR_MAX_CCH−P RXLEV_ACCESS_MIN=the minimum received level at the mobile station required for accessing the system in a normal cell,
LSA_RXLEV_ACCESS_MIN=the minimum received level at the mobile station required for accessing the system in a special cell,
MS_TXPWR_MAX_CCCH=the maximum transmission power level the mobile station can use for accessing the system unless otherwise commanded,
P=the maximum output power of the mobile station, considering the minimum requirement to be fulfilled if C1>0.

9. A method according to claim 6, characterized by
calculating for a normal cell a cell selection parameter C2=C1−CELL_RESELECT_OFFSET where
CELL_RESELECT_OFFSET=the cell selection offset in the cell, calculating for a special cell a cell selection parameter C2=[(A+LSA_CAMPING_MARGIN)-Max(B, 0)]-CELL_RESELECT_OFFSET where LSA_CAMPING_MARGIN is the margin added to the received signal level before the cell selection parameter is calculated to the effect that the selection probability of a special cell is improved with respect to a normal cell, selecting a cell with the highest value of the cell selection parameter C2.

10. A method according to claim 1, characterized in that the cell selection parameter is a cell re-selection criterion C2 in accordance with GSM recommendations.

11. A method according to claim 1 characterized by a step of preventing the manipulation of the calculation of the cell selection parameter for prioritizing special cells after the mobile station is switched on until the mobile station the first time camps on some cell.

12. A cellular radio system comprising mobile stations and base stations, the mobile stations being arranged to measure in the idle mode the received signal levels of cells and to select as the serving base station the cell which is the best on the basis of a cell selection parameter calculated by means of the measured signal levels, characterized in that the mobile station comprises means for storing a special cell list, means for comparing the cells to be measured with the special cell list, a means which checks if a cell identified as a special cell fulfils the pre-determined minimum requirement of cell selection on the basis of the measured signal level, and means for manipulating the calculation of the cell selection parameter of a special cell that fulfils this minimum requirement to the effect that the selection probability of a special cell is improved with respect to a normal cell.

13. A system according to claim 12, characterized in that the means for manipulating the calculation of the cell selection parameter comprise a means that adds a pre-determined margin to the measured signal level of a special cell to the effect that the selection probability of a special cell is improved with respect to a normal cell.

14. A system according to claim 12, characterized in that the means for manipulating the calculation of the cell selection parameter comprise a means that adds a pre-determined margin to the measured cell selection parameter of a special cell, calculated in the normal manner, to the effect that the selection probability of a special cell is improved with respect to a normal cell.

15. A system according to claim 13, characterized in that the broadcasting of the base station of the cell comprises the pre-determined margin.

16. A system according to claim 13, characterized in that the broadcasting of the base station of the cell comprises a first parameter indicating the lowest signal level the mobile station is to receive from the measured cell to fulfil the minimum requirement for a normal cell.

17. A system according to claim 16, characterized in that the broadcasting of the base station of the cell comprises a second parameter indicating the lowest signal level the mobile station is to receive from the measured cell to fulfil the minimum requirement for a special cell, the second parameter being higher than the first parameter.

18. A system according to claim 12, characterized in that the mobile communication system is GSM or DCS or the like, and that the minimum requirement is a path loss criterion parameter C1 and the cell selection parameter is a re-selection, criterion C2.

19. A system according to claim 12, characterized in that the special cells are cells specified to belong to the local location area of the subscriber.

20. A system according to claim 12, characterized in that the means for manipulating the calculation of the cell selection parameter for prioritizing special cells is arranged to be disabled after the mobile station is switched on until the mobile station the first time camps on some cell.

21. A mobile station which is arranged to measure in the idle mode the received signal levels of cells and to select as the serving base station the cell which is the best on the basis of a cell selection parameter calculated by means of the measured signal levels, characterized in that the mobile station comprises means for storing a subscriber-specific special cell list, means for comparing the cells to be measured with the special cell list, a means which checks if a cell identified as a special cell fulfils the pre-determined minimum requirement of cell selection on the basis of the measured signal level, and means for manipulating the calculation of the cell selection parameter of a special cell that fulfils the minimum requirement to the effect that the selection probability of a special cell is improved with respect to a normal cell.

22. A mobile station according to claim 21, characterized in that the mobile station comprises means for incrementing the measured signal level or the normally calculated value of the cell selection parameter by a pre-determined margin to the effect that the selection probability of a special cell is improved with respect to a normal cell.

23. A mobile station according to claim 21, characterized in that the mobile station is arranged to receive the predetermined margin and possibly the minimum requirement of cell selection in the broadcasting of the currently serving base station.

24. A mobile station according claim 21, characterized in that the mobile station is a mobile station of a GSM or DCS or corresponding mobile communication system, and that the minimum requirement is a path loss criterion parameter C1 and the cell selection parameter is a re-selection parameter C2.

25. A mobile station according to claim 21, characterized by means with which the means for manipulating the calculation of the cell selection parameter for prioritizing special cells is arranged to be disabled after the mobile station is switched on until the mobile station the first time camps on some cell.

* * * * *